3,644,402
PROCESS FOR PRODUCING α-PYRROLIDONE
Kazumi Takagi, Teruo Matsuda, and Masahiro Murakami, Niihama-shi, Japan, assignors to Sumitomo Chemical Co., Ltd., Osaka, Japan
No Drawing. Filed May 6, 1969, Ser. No. 822,307
Claims priority, application Japan, May 16, 1968, 43/33,083
Int. Cl. C07d 27/08
U.S. Cl. 260—326.5                                    8 Claims

ABSTRACT OF THE DISCLOSURE

High yields of α-pyrrolidone are obtained by reacting succinonitrile with hydrogen under pressure in the presence of a hydrogenating catalyst at a temperature of 80° to 200° C. in a nitrogen-containing basic organic solvent for a reaction period shorter than 3.7 minutes and then contacting the thus obtained reaction mixture with water or aqueous ammonia solution at a temperature of 200° to 300° C. Alpha-pyrrolidone is useful as an important raw material of 4-nylon and as a raw material for the production of N-methyl pyrrolidone and N-vinyl pyrrolidone, both useful as a high boiling solvent, or as a fiber raw material.

---

The present invention relates to a process for preparing α-pyrrolidone from succinonitrile.

Alpha-pyrrolidone is useful as an intermediate for preparing N-methyl pyrrolidone and N-vinyl pyrrolidone, which in turn are useful as industrial organic solvents or fiber raw materials. It is also useful as an important raw material of 4-nylon.

Alpha-pyrrolidone has been prepared by catalytically reacting succinonitrile with hydrogen under pressure in an aqueous ammonia solution, as disclosed in U.S. Pat. No. 3,095,423 (1963). In this process, α-pyrrolidone can be obtained in one step. However, since the yield of the reaction is very low, for example, only 25% based on succinonitrile, the process is not economically valuable. Another disadvantage of the process disclosed in U.S. Pat. No. 3,095,423 is that unreacted succinonitrile is readily converted to succinoamide and other high boiling products because of the presence of water in the aqueous ammonia solution, and so it is difficult to obtain higher yields of α-pyrrolidone. Furthermore, the reducing catalyst is remarkably poisoned and cannot be reused.

It has been found, in accordance with the present invention, that α-pyrrolidone can be obtained in a high yield by dividing this knonw process into two steps, that is, into a hydrogenation step and a hydrolysis step.

One object of the present invention is to provide an improved process for preparing α-pyrrolidone from succinonitrile in a high yield.

Other objects will be apparent from the following description.

In order to accomplish these objects, the present invention provides a process for producing α-pyrrolidone which comprises contacting succinonitrile with hydrogen under pressure in the presence of a hydrogenating catalyst in a nitrogen-containing basic organic solvent at a temperature of 80° C. to 200° C. for a period of time less than 3.7 minutes, adding water or aqueous ammonia solution into the obtained reaction mixture, and then heating the reaction mixture at a temperature of 200° C.–300° C.

Examples of the nitrogen-containing basic organic solvent used in the process of the present invention include N,N-dimethyl formamide, α-pyrrolidone, N-methylpyrrolidone, and amines such as pyridine and trimethylamine. Pyridine is particularly preferable, as catalytic activity is not lowered when using such, even when the reaction is repeated 25 times at batch system. Employment of a solvent such as an aliphatic or aromatic hydrocarbon, aliphatic alcohol, etc. lowers the yeild of α-pyrrolidone. In particular, the presence of an aliphatic alcohol is not preferable because of an alkylation reaction of amine as described in J. Org. Chem. 23, 1352 (1958).

Examples of the catalyst used in the hydrogenation of the present invention include nickel-silica gel, palladium carbon, Raney nickel, Raney cobalt, etc., Raney nickel is particularly preferable.

In the present invention, the amount of hydrogen employed in the reaction is 2 to 4 moles, preferably 2 to 3 moles, per mole of succinonitrile, the hydrogen pressure is 50 to 200 atm., preferably 80 to 150 atm.

The hydrogenation temperature of the present invention is 80° to 200° C., preferably 105° to 166° C.

The hydrogenation reaction time is the most important factor for obtaining α-pyrrolidone in a high yield. If the hydrogenation time is too long, the yield of α-pyrrolidone is extremely lowered. In general, the shorter the reaction time, the higher the reaction yield.

In a preferred mode of operation, the reaction mixture is heated to the desired temperature without stirring, and subsequently stirred for 0.5 to 3.7 minutes to complete the hydrogenation. The resultant reaction mixture is then hydrolyzed. Such procedure maximizes the yield of α-pyrrolidone. If the reaction time is longer than 3.7 minutes, the yield of α-pyrrolidone is lowered, because the α-aminobutyronitrile produced rapidly decomposes at the reaction temperature. Therefore, the reaction time should be less than 3.7 minutes for both continuous and batch systems. On the other hand, if the reaction time is less than 0.5 minute, the reaction heat is rapidly increased. Therefore, the reaction times should be longer than 0.5 minute to control the reaction heat.

After completion of the hydrogenation, water or aqueous ammonia solution is added to the reaction mixture. The amount of water to be added is 1 to 20 moles per mole of employed succinonitrile. The yield of α-pyrrolidone is increased by employment of aqueous ammonia solution of a concentration of 60% or less in the place of water, and the yield may be further increased by adding alumina, silica, zinc oxide, etc. into the reaction mixture. The temperature in this reaction is 200° to 300° C., preferably 210° to 260° C. Reaction temperatures outside of these ranges result in greatly reduced yields of α-pyrrolidone. The reaction time may be extended, but it is preferable to complete the reaction within 1–3 hours.

The reaction is preferably carried out under a nitrogen atmosphere.

The present invention will be further illustrated by the following examples, but it is not intended to limit the present invention to them.

EXAMPLE 1

Into a 300 cc.-autoclave provided with an electromagnetic stirrer were charged 24 g. of succinonitrile, 100 ml. of pyridine and 4 g. of Raney nickel catalyst immersed in pyridine, and hydrogen gas was charged thereto to a pressure of 100 kg./cm.$^2$ at a room temperature. The autoclave was immersed in an oil bath. The stirring of the reaction mixture was begun after the inside temperature of the autoclave reached 120° C. With the beginning the stirring, the reaction proceeded rapidly, and after stirring for 2.7 minutes, the reaction was completed.

The reaction mixture was filtered to remove the catalyst. The filtrate was transfered into an autoclave again and 60 ml. of 28%-aqueous ammonia solution was charged in the autoclave. Nitrogen gas was charged into the autoclave to a pressure of 35 kg./cm.$^2$ and the reaction mixture was heated at a temperature of 210° C. in an oil bath for 120 minutes while the pressure was elevated to 94 kg./cm.$^2$.

After the reaction was completed, the reaction mixture was transferred into a distillation flask from the autoclave and distilled under atmospheric pressure to remove low boiling fractions, and then was distilled under reduced pressure to obtain 18.4 g. of α-pyrrolidone. Unreacted succinonitrile was not at all found. The yield of α-pyrrolidone on the basis of succinonitrile was 72%. Where α-pyrrolidone was substituted for pyridine as a solvent, almost the same result was obtained. Where 60 ml. of water was used in place of 60 ml. of the 28% aqueous ammonia solution, the yield was 60%.

COMPARATIVE EXAMPLE 1

The reaction was carried out according to the reaction conditions similar to those in Example 1 except methanol was used as a solvent in place of pyridine, and 14.3 g. of α-pyrrolidone was obtained. The yield of α-pyrrolidone was 56%.

COMPARATIVE EXAMPLE 2

The reaction was carried out according to the reaction conditions similar to those in Example 1 except that the hydrogenation was carried out for 10 minutes, and 13.5 g. of α-pyrrolidone was obtained. The yield of α-pyrrolidone was 53%.

COMPARATIVE EXAMPLE 3

Into a 300 cc.-autoclave provided with an electro-magnetic stirrer were charged 24 g. of succinonitrile, 100 cc. of pyridine and 4 g. of Raney nickel catalyst immersed in pyridine, and hydrogen gas was charged into the autoclave to a pressure of 100 kg./cm.$^2$ at a room temperaure. The autoclave was immersed in an oil bath and, the stirring of the reaction mixture was commenced after the inside temperature of the autoclave reached to 120° C. After stirring for 2.5 minutes, the reaction was completed. The reaction mixture was filtered to remove the catalyst, and the filtrate was distilled to remove low boiling fractions. Into the residue was added 60 ml. of 28% aqueous ammonia solution. The resulting reaction mixture was transferred into an autoclave and nitrogen gas was charged into the autoclave to 35 kg./cm.$^2$. The reaction mixture was heated at a temperature of 210° C. in the oil bath for 120 minutes.

The reaction mixture was transferred into a distillation flask from the autoclave and subjected to distillation under atmospheric pressure to remove low boiling fractions, and then to distillation under reduced pressure to obtain 7.9 g. of α-pyrrolidone. The yield of α-pyrrolidone was 31.0%.

What is claimed is:

1. In a process for producing α-pyrrolidone comprising contacting succinonitrile in a solvent with hydrogen under pressure in the presence of a hydrogenating catalyst, the improvement which comprises said solvent being a nitrogen-containing basic, organic solvent, said process being conducted at a temperature of from 80° C. to 200° C. and the period of time of the contacting of the succinonitrile with the hydrogen being less than 3.7 minutes and the improvement being further characterized as subsequently adding a member selected from the group consisting of water and an aqueous ammonia solution to the reaction mixture, and heating the reaction mixture at a temperature of from 200° C. to 300° C.

2. A process according to claim 7, wherein the hydrogen pressure is 50–200 atm.

3. A process according to claim 7, wherein the hydrogenation catalyst is selected from the group consisting of nickel-silica gel, palladium carbon, Raney nickel or Raney cobalt.

4. A process according to claim 7, wherein the nitrogen-containing basic, organic solvent is selected from the group consisting of pyridine, N,N-dimethyl formamide, α-pyrrolidone, N-methylpyrrolidone, trimethylamine.

5. A process according to claim 7, wherein the nitrogen-containing basic, organic solvent is pyridine.

6. A process according to claim 7, wherein the period of time of contacting succinonitrile with hydrogen is 0.5–3.7 minutes.

7. A process according to claim 6, wherein the member added to the reaction mixture is an aqueous ammonia solution having a concentration of 60% or less.

8. A process according to claim 7, wherein a member selected from the group consisting of alumina, silica and zinc oxide is additionally added to the reaction mixture.

References Cited

UNITED STATES PATENTS 3,095,423    6/1963    Copenhaver et al. ___ 260—326.5

ALEX MAZEL, Primary Examiner

J. A. NARCAVAGE, Assistant Examiner